INVENTORS
SAMUEL R. ROSEN,
& ROBERT G. BAKER
BY Boworth Sessions
Herrstrom & Cain
ATTORNEYS INVENTORS
SAMUEL R. ROSEN,
& ROBERT G. BAKER
BY Borworth, Sessions
Herstrom & Cain
ATTORNEYS United States Patent Office Re. 27,865
Reissued Jan. 1, 1974

27,865

APPLICATOR HAVING A FIXED MODULE WITH STATIC PARTS AND A REMOVABLE MODULE WITH MOVING PARTS

Robert G. Baker, Avon, and Samuel R. Rosen, Lorain, Ohio, assignors to Nordson Corporation, Amherst, Ohio Original No. 3,570,725, dated Mar. 16, 1971, Ser. No. 776,177, Nov. 15, 1968. Application for reissue Oct. 13, 1972, Ser. No. 297,455

Int. Cl. B67d *3/00*

U.S. Cl. 222—504 27 Claims

Matter enclosed in heavy brackets [ ] appears in the original patent but forms no part of this reissue specification; matter printed in italics indicates the additions made by reissue.

ABSTRACT OF THE DISCLOSURE

A fluid-operated modular apparatus for extruding and applying viscous liquids such as molten adhesives. The apparatus includes a gun in the form of a readily removable module that attaches to a fixed service block module which receives the supply lines for the viscous liquid and the operating air for example. The service block and gun have passages which register when the apparatus is assembled whereby the gun may be easily removed from the fixed service block and replaced without disconnecting any fluid lines or other service equipment.

BACKGROUND OF THE INVENTION

This invention relates to the application of viscous liquids to surfaces and especially to equipment used to apply beads, ribbons or small unitary deposits of the extruded material in a desired pattern under the high-speed production conditions. More particularly the invention relates to equipment for applying molten adhesives to various materials such as flat sheets or webs of paper or cardboard used in packaging and sealing a variety of products.

Liquid adhesives have many applications in the packaging art particularly in connection with paper and cardboard-type packaging materials. One particular type of liquid adhesive generally termed "hot melt" is often preferred where there is a need for very short "setting time," setting time being the time interval between the application of the adhesive and the completion of the bonding together of the parts being adhered or sealed.

Hot melt adhesives are typically of the asphaltic or synthetic resin type and are generally in their solid state at room temperature. When heated to molten form, however, they change in physical state to a relatively viscous liquid which may be pumped through the nozzle of an applicator tool or gun and applied to a surface in the form of a continuous bead or ribbon or as intermittent unitary deposits. Normally, such adhesives are converted to a molten state in a heater and then transmitted to applicator guns under pressure through heated lengths of flexible hose. The applicator gun is preferably heated also to assure that the adhesive remains in molten form until it leaves the nozzle of the gun.

In many high-speed packaging applications, the molten adhesive is applied to moving sheet material such as a web of paper or flattened cardboard cartons. In other applications, the adhesive is applied to filled containers prior to the sealing of the flaps or an end closure. In still other applications, the molten adhesive is used in the assembly of parts such as in the assembly of electronic units.

Certain types of applicator guns are operated by means of fluid cylinders which open and close a valve in the molten adhesive feed line and thus interrupt the extrusion of the molten adhesive from the nozzle of the gun. Where air-operated guns are used it is necessary of course to use an air pressure line from a pressure source. Also, since the body of the gun is normally heated to maintain the adhesive in a molten state, it is essential that electrical service lines also be connected to the gun.

A principal disadvantage of this type of equipment in the past has been the time-consuming cleaning operation which must be accomplished at periodic intervals. The cleaning requires the removal of all of the fluid lines and other service lines from the gun and afterward the reconnection of the lines as well as the careful repositioning of the gun so as to extrude the beads of viscous liquid at a proper predetermined location. All this is quite time-consuming and requires the interruption of a continuous production facility at frequent intervals.

The apparatus of the present invention, however, substantially reduces the difficulties indicated above and affords other features and advantages not obtainable from the prior art.

SUMMARY OF THE INVENTION

It is among the objects of the invention to facilitate the removal and accurate remounting of an extrusion gun used to apply beads of viscous liquids to translating surfaces.

Another object is to reduce the number of supply lines and hervice lines required to suply a plurality of extrusion guns used to apply viscous liquids such as molten adhesives to translating packaging materials or the like.

Still another object is to reduce the time needed to remove and replace an extrusion gun from a fixed mount in a system for applying molten adhesives to packaging materials wherein the gun must be frequently cleaned.

These and other objects are accomplished by a modular apparatus with a fluid- or air-type operating system and a pumping system for the viscous liquid to be extruded, the apparatus including a fixed service module defining a passage or manifold for the viscous liquid and a passage or manifold for operating fluid. The passage for the viscous liquid communicates with the pumping system and the passage for operating fluid communicates with a fluid pressure line. A removable gun module is attachable to the fixed service block module and defines a passage communicating between the viscous liquid passage in the service block module and an extrusion nozzle, and a passage for operating fluid communicating between the operating fluid passage in the service block and a fluid cylinder. The gun module also has a piston adapted for reciprocating movement therein in response to the operating fluid pressure. The piston is operatively connected to a valve which is adapted to open and close the viscous liquid passage in the gun module and means is provided for removably securing the gun module to the fixed service block with the respective viscous liquid passages and the respective operating fluid passages in registry with one another and sealed at the mating faces thereof.

The service block module may be adapted to receive several gun modules all of which are serviced through the service block module from the same viscous liquid-pumping system and operating fluid supply lines. Also each gun has a fixed mounting position on the service block module which is fixed to the associated equipment so that the individual gun modules can be removed and replaced without changing the precise location at which the beads of extruded material will be applied to a translating surface.

In the preferred embodiment a heater is provided in the individual gun modules to maintain the adhesive in a molten state until after it leaves the nozzle of the gun.

DESCRIPTION OF THE PREFERRED EMBODIMENT

Figure 1:
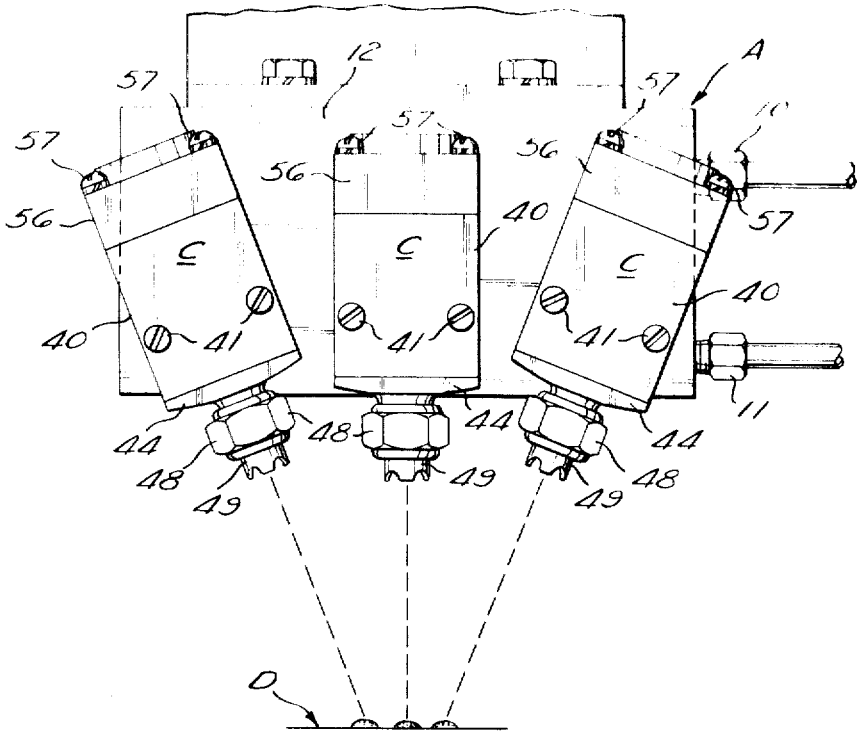
FIG. 1 is an elevational view of a three-gun modular apparatus for extruding a molten adhesive, embodying the invention.
Figure 2:
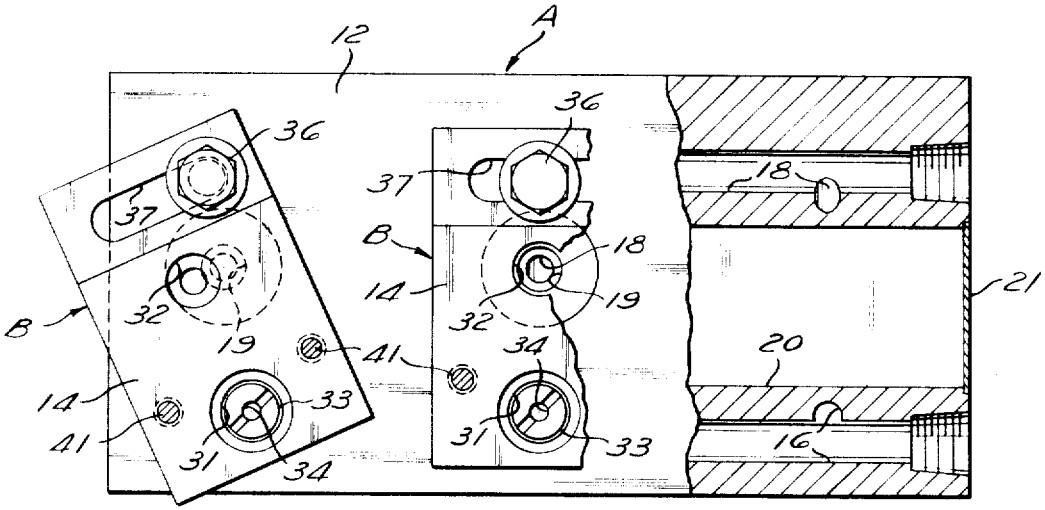
FIG. 2 is an elevational view of the apparatus of FIG. 1 with the gun modules removed and with parts broken away and shown in section for the purpose of illustration.
Figure 3:
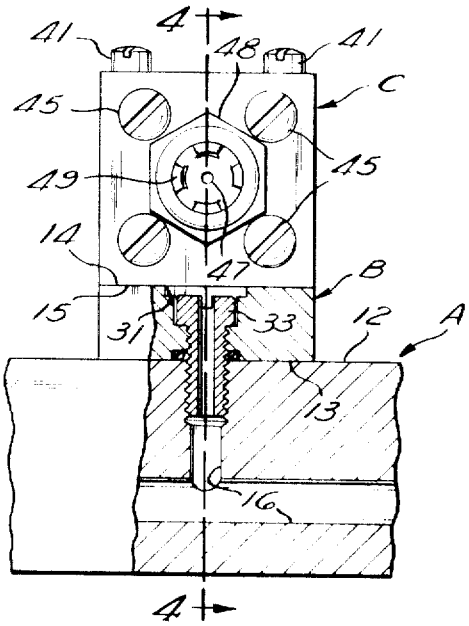
FIG. 3 is a fragmentary front elevation of the apparatus of FIG. 1 but drawn to a larger scale and with parts broken away and shown in section.

Referring more particularly to the drawings, FIGS. 1 and 2 show a three-gun modular apparatus embodying the invention and adapted for use in connection with equipment for heating and circulating a hot-melt type adhesive to be applied at three locations simultaneously on a translating surface. The apparatus comprises a service block modula A, three swivel adapters B (FIG. 2) adjustably connected to the service block module A, and three gun modules C each connected to a respective swivel adapter B. The gun modules C are arranged to extrude a hot-melt adhesive and to apply the extruded material at three locations on a translating surface D which may be for example cardboard cartons to be filled and sealed.

The gun modules C are air operated as will be more particularly described below and air is supplied to the apparatus from a pressure source through an operating air fitting 10 which is threadedly received in the service block module A. The molten adhesive which is extruded by the gun modules C is supplied to the apparatus through a fitting 11 which is also threadedly received in the service block module A.

The service block module A and each swivel adapter B have mating faces 12 and 13 respectively in relative positions which provide proper registration between their respective supply passages or manifold ports for operating air and molten adhesive. These passages or manifolds will be described in detail below. Each swivel adapter B and its respective gun module C have mating faces 14 and 15 respectively (FIG. 4) in relative position to provide proper registration between their respective passages for the operating air and molten adhesive.

The service block module A has intersecting passages drilled therein which form a molten adhesive supply mainfold 16. The manifold 16 receives molten adhesive through the inlet fitting 11 and transmits it to ports 17 in the face 12 of the service block A. Operating air for the gun modules C is supplied through another manifold 18 which receives operating air through the fitting 10 and transmits it to three ports 19.

The rearward side of the service block A opposite face 12 has a longitudinal channel 20 formed therein which is covered by a sheet metal cover plate 21. The space defined by the channel 20 and cover plate 21 serves as a receptacle for a thermostatic control 22 which monitors the temperature of the service block and adjusts a heating element. A longitudinal bore 23 extending through the service block from one end to the other between the molten adhesive manifold 16 and the operating air manifold 18, provides a receptacle for one or more heating elements (not shown) which may be used to maintain the molten adhesive being transmitted to the gun modules C at a desired temperature by heat transfer through the closely contacting parts.

The swivel adapters B each have a molten adhesive passage 31 and an operating air passage 32, the passage 31 being in registration with its respective port 17 in the service block module A and the passage 32 being in registration with the operating air port 19.

Each swivel adapter B is secured to the service block A by means of a hollow connector 33 which is seated in the swivel adapter B with its lower threaded end screwed into the respective port 17. This arrangement permits the swivel adapter B to pivot about the axis of the port 17 and molten adhesive pasage 31 while permitting the molten adhesive to pass through an axial passage 34 through the threaded connectors 33 regardless of what angular position the swivel adapter B is in. The rearward end of each swivel adapter B is bolted to the service block A by a machine bolt 36 which extends through a slot 37 in the swivel adapter and thus enables the adapter to be swiveled to a number of different angular positions. With this arrangement the spacing between the deposits of molten adhesive on the translating surface may be adjusted as desired.

The operating air passage 32 communicates with a counter-bore formed in the service block module at the air ports 19 so that the passages 32 are in registration with the ports 19 and the air manifold 18 throughout the range of pivotal movement of the respective swivel adapter B.

The gun modules C each comprise a barrel block 40 which supports the working parts and which is bolted to the swivel adapter B by machine screws 41 (*illustrated as being broken off in FIG. 4*) which extend through the barrel block and into threaded openings 42 in the swivel adapter B. The block 40 has a central barrel [43] formed therein and the forward end thereof is closed by a nozzle plate 44 bolted to the barrel block 40 by machine screws 45. The nozzle plate 44 has an enlarged chamber 46 therein with a nozzle port 47 at one end through which the molten adhesive is extruded. A nozzle retaining nut 48 is threaded over the projecting neck of the nozzle plate 44 to secure the extrusion nozzle head 49 in position.

Located within the nozzle chamber 46 is a reciprocating valve element 50 which is biased to a closed position in engagement with the edges of the nozzle port 48 by means of a helical spring 51. The valve element 50 is secured to the end of an operating rod 52 which extends axially through the barrel [43] and through a sealing pin 53 snugly received in the rearward portion of the barrel [43]. The sealing pin 53 has a radial flange 54 at its forward end which rests against a shoulder 55 in the barrel [43]. Thus, the pin 53 serves as a bearing element for the helical spring 51 so that the spring tension urges the valve element 50 to its closed position.

The rearward end of the barrel block 40 is closed by a cylinder block 56 which is fastened in place by machine screws 57. The cylinder block 56 and barrel block 40 define therein a piston chamber 58 within which a fluid piston 59 reciprocates axially in response to the pressure of operating air. Operating air is transmitted to the chamber 58 through a passage 60 which admits the air at the forward side of the piston 59. Thus the operating air pressure will tend to force the piston 59 to the rear within the chamber 58 and pull the operating rod 52 rearwardly to move the valve element 50 out of port 48, the operating rod being adjustably retained at the rearward side of the piston 59 by a pair of adjacent cooperating jam nuts 61 and 62. This permits molten adhesive to pass through a molten adhesive passage 63 in the barrel block 40 into the barrel [43] and out through the nozzle port 47 in the form of an extruded column which is deposited on the translating surface D below.

Figure 4:
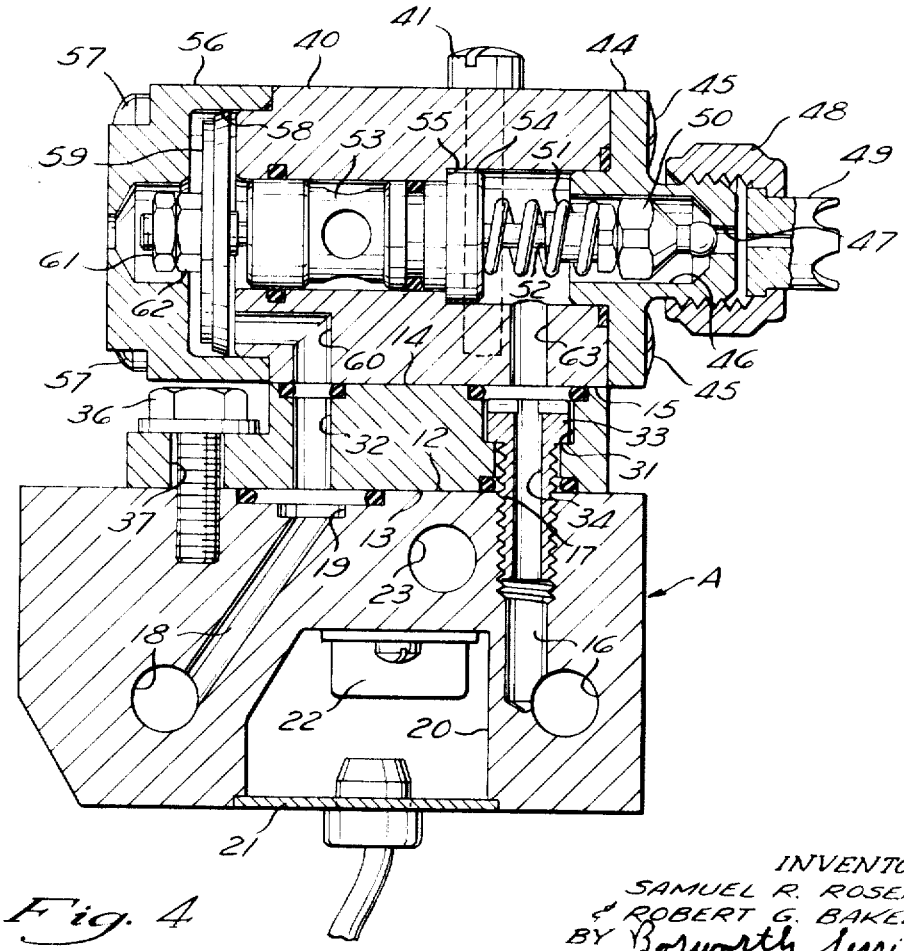
FIG. 4 is a sectional view taken on the line 4—4 of FIG. 3.

When air pressure is reduced, the helical spring 51 overcomes the force tending to move the piston 59 to the rear and the operating rod and valve element 50 will be forced to the position shown in FIG. 4 so as to close the port 47.

OPERATION

The modular apparatus shown and described herein is designed for a specific application wherein three columns of molten adhesive are to be deposited on the translating surface D. However it will be readily apparent that the advantages of the invention can be derived equally as well where a service block is used in connection with only one gun module C.

While it is not essential to the invention in a broad sense, in the apparatus shown, a swivel adapter B is provided to permit one or more gun modules C attached to a common service block A, to be pivoted to a desired angular relation to one another to obtain a particular pattern of adhesive deposit on the translating surface. As shown in FIG. 1, the spacing between deposits may be adjusted merely by changing the distance between the gun modules and the translating surface D.

As indicated above in the "Background of the Invention," guns which extrude a molten adhesive must be cleaned quite frequently and this requires disconnection of service lines from all the various fittings. With the present apparatus, however, disconnection is never required since only the gun module need be removed and this may be easily accomplished merely by unfastening the machine screws 41 which secure the gun module to the swivel adapter B. When this is done, another gun module may be immediately secured in position on the swivel adapter B and it will be accurately positioned without further adjustment. The only preliminary step required is that of assuring that proper valves are closed to shut off pressure in the molten adhesive line to the fitting 11 and also to shut off air pressure to the operating air fitting 10.

In the three-gun modular assembly shown and described the distance between the strips of adhesive deposited on the translating surface D may be adjusted to a very close spacing so long as to provide a single wide band or ribbon. This type of adhesive pattern is preferred in many applications.

If desired, and according to an alternative form of the invention, the service block itself may be provided with valves for shifting off pressure in the operating air manifold and the molten adhesive manifold.

The swivel adapter B may be eliminated entirely if desired since the passages in the gun modules C will properly register with the respective ports in the service block module A. Threaded holes are normally provided in the service block module A to receive the machine screws 41 to accommodate this alternative arrangement.

While the invention has been shown and described with respect to a specific embodiment thereof, it will be understood that variations and modifications will be readily apparent to those skilled in the art within the intended spirit and scope of the invention. Wherefore the patent is not to be limited in any way that is inconsistent with the extent to which the progress in the art has been advanced by the invention.

We claim:

1. A modular apparatus for extruding a viscous liquid from a pressurized source onto a translating surface, comprising:

a service block module having fixed mounting means and essentially only static parts and defining a passage for viscous liquid;

a readily removable gun module attachable to said service block module;

an extrusion nozzle mounted on said gun module;

said gun module including essentially all the movable parts and defining a passage for viscous liquid communicating between said viscous liquid passage in said service block module and said extrusion nozzle, said passage in said gun module being in sealing registration with said viscous liquid passage in said service block module when said modules are in assembled relation;

a movable valve element in said gun module for opening and closing said nozzle; and movable means in said gun module for operating said valve.

2. Apparatus as defined in claim 1 including means for changing the angular position of said gun module relative to said fixed service block module to change the direction of said nozzle while said modules are in assembled relation.

3. Apparatus as defined in claim 2 wherein said means for changing the angular position of said gun module comprises a swivel adapter mounted between said service block module and said gun module, a threaded connector extending through said adapter and threaded into said service block module, said connector defining an axis about which said swivel adapter can pivot, means defining a slot in said swivel adapter, spaced from said connector, and a fastener extending through said slot and into said service block module for securing said swivel adapter in a desired angular position relative to said service block module.

4. Apparatus as defined in claim 3 wherein said threaded connector screw has an axial passage which communicates between said passage for viscous liquid in said service block module and said passage for viscous liquid in said gun module.

5. Apparatus as defined in claim 1, including a plurality of gun modules mounted on said service block module.

6. Apparatus as defined in claim 1, wherein said means for operating said valve comprises a fluid piston in said gun module operatively connected to said valve and fluid pressure means for operating said piston.

7. A modular apparatus for extruding a viscous liquid from a pressurized source onto a translating surface, comprising:

a fixed service block module having fixed mounting means and essentially only static parts and defining a passage for viscous liquid and a passage for operating fluid;

a readily removable gun module attachable to said service block module;

an extrusion nozzle mounted on said gun module;

means defining a fluid cylinder in said gun module;

a piston in said fluid cylinder;

said gun module including essentially all the movable parts and defining a first passage communicating between said viscous liquid passage in said service block module and said extrusion nozzle and a second passage communicating between said fluid passage in said service block module and said fluid cylinder, said first and second passages being in sealing registration with their respective passages in said service block module when said modules are in assembled relation; and a movable valve element in said gun module, operatively connected to said piston for opening and closing said nozzle means.

8. A modular apparatus for applying a liquid to a surface, comprising:

a service block module having mounting means and defining a passage for liquid;

a readily removable gun module attachable to said service block module;

nozzle means on said gun module;

valve means in said gun module for opening and closing said nozzle means;

valve-operating means in said gun module for operating said valve means;

said gun module including essentially all the movable parts and defining a passage for liquid communicating between said liquid passage in said service block module and said nozzle means, and said passage in said gun module communicating with said liquid passage in said service block module when said modules are in assembled relation.

9. Apparatus as defined in claim 8 including heating means in said service block module for heating liquid in the respective liquid passages of said modules and thermostatic control means in said service block module for controlling said heating means.

10. A modular apparatus for extruding a liquid from a pressurized source onto a surface, comprising:

a service block module having fixed mounting means and essentially only static parts and defining a passage for liquid and a passage for operating fluid;

a readily removable gun module attachable to said service block module;

nozzle means on said gun module;

means defining a fluid cylinder in said gun module;

a piston in said fluid cylinder;

said gun module including essentially all the movable parts and defining;

a first passage communicating between said liquid in said service block module and said nozzle means; and a second passage communicating between said fluid passage in said service block module and said fluid cylinder;

said first and second passages being in sealing registration with their respective passages in said service block module when said modules are in assembled relation; and a movable valve element in said gun module, operatively connected to said piston for opening and closing said nozzle means.

*11. A modular apparatus for extruding a viscous liquid from a pressurized source onto a surface, comprising*

*a service block module having mounting means and essentially only static parts and defining a passage for viscous liquid,*

*a removable gun module attachable to said service block module,*

*said service block module having a relatively large gun module contacting surface area and said gun module having a relatively large service module contacting surface area, said surface areas being adapted to be intimately secured together so as to establish relatively large contacting surface areas between said modules,*

*heating means mounted in said service block module for heating said gun module through the transfer of heat via said large contacting surface areas between said modules,*

*an extrusion nozzle mounted on said gun module,*

*said gun module including essentially all the movable parts and defining a passage for viscous liquid communicating between said viscous liquid passage in said service block module and said extrusion nozzle, said passage in said gun module being in sealing registration with said viscous liquid passage in said service block module when said modules are in assembled relation.*

*a movable valve element in said gun module for opening and closing said nozzle, and*

*movable means in said gun module for operating said valve.*

*12. Apparatus as defined in claim 11 and further including a thermostat control means mounted in said service module for controlling said heating means.*

*13. Apparatus as defined in claim 11 in which said movable means in said gun module comprises*

*motor means including a movable element mounted within a motor chamber of said gun module, and*

*means interconnecting said movable element of said motor means and said valve element such that actuation of said motor effects and controls movement of said valve element.*

*14. Apparatus as defined in claim 13 which further includes sealing means located about said interconnecting means to prevent said viscous liquid from leaking past said interconnecting means into said motor chamber of said gun module.*

*15. Apparatus as defined in claim 11 in which said valve element is movable in an axial direction within said gun module and in which said movable means in said gun module comprises*

*means defining a cylinder in said gun module, said cylinder being axially aligned with said valve element,*

*a piston in said cylinder, and*

*means interconnecting said piston and said valve element such that axial movement of said piston effects axial movement of said valve element.*

*16. Apparatus as defined in claim 15 which further includes sealing means located about said interconnecting means and operable to prevent said viscous liquid from leaking past said interconnecting means into said cylinder.*

*17. Apparatus as defined in claim 7 in which said service block module has a relatively large gun module contacting surface area and said gun module has a relatively large service module contacting surface area, said surface areas being adapted to be intimately secured together so as to establish relatively large contacting surface areas between said modules, and said apparatus further comprising*

*heating means mounted in said service block module for heating said gun module through the transfer of heat via said large contacting surface areas between said modules.*

*18. Apparatus as defined in claim 17 and further including a thermostat control means mounted in said service module for controlling said heating means.*

*19. Apparatus as defined in claim 8 in which said service block module has a relatively large gun module contacting surface area and said gun module has a relatively large service module contacting surface area, said surface areas being adapted to be intimately secured together so as to establish relatively large contacting surface areas between said modules, and said apparatus further including*

*heating means mounted in said service block module for heating said gun module through the transfer of heat via said large contacting surfaces between said modules.*

*20. Apparatus as defined in claim 19 and further including a thermostat control means mounted in said service module for controlling said heating means.*

*21. Apparatus as defined in claim 8 in which said valve operating means comprises*

*motor means including a movable element mounted within a motor chamber of said gun module, and*

*means interconnecting said movable element of said motor means and said valve element such that actuation of said motor effects and controls movement of said valve element.*

*22. Apparatus as defined in claim 21 which further includes sealing means located about said interconnecting means to provide said viscous liquid from leaking past said interconnecting means into said motor chamber of said gun module.*

*23. Apparatus as defined in claim 8 in which said valve element is movable in an axial direction within said gun module and in which said valve operating means comprises*

*means defining a cylinder in said gun module, said cylinder being axially aligned with said valve element,*

*a piston in said cylinder, and*

*means interconnecting said piston and said valve element such that axial movement of said piston effects axial movement of said valve element.*

*24. Apparatus as defined in claim 23 which further includes sealing means located about said interconnecting means and operable to prevent said viscous liquid from leaking past said interconnecting means into said cylinder.*

*25. Apparatus as defined in claim 10 in which said service block module has a relatively large gun module contacting surface area and said gun module has a relatively large service module contacting surface area, said surface areas being adapted to be intimately secured together so as to establish relatively large contacting surface areas between said modules, and said apparatus further comprising*

*heating means mounted in said service block module for heating said gun module through the transfer of heat via said large contacting surface areas between said modules.*

*26. Apparatus as defined in claim 25 and further including a thermostat control means mounted in said service module for controlling said heating means.*

*27. Apparatus as defined in claim 11 wherein said gun*

*module contacting surface area and said service module contacting surface area are parallel to each other.*

References Cited

The following references, cited by the Examiner, are of record in the patented file of this patent or the original patent.

UNITED STATES PATENTS

| | | | |
|---|---|---|---|
| 3,251,341 | 5/1966 | Eburn, Jr. et al. | 118—315 X |
| 3,332,580 | 7/1967 | Spencer et al. | 222—504 X |
| 3,348,520 | 10/1967 | Lockwood | 239—551 X |

STANLEY H. TOLLBERG, Primary Examiner

J. M. SLATTERY, Assistant Examiner

U.S. Cl. X.R.

239—551; 118—315